United States Patent [19]

Bischoff et al.

[11] Patent Number: 4,652,328
[45] Date of Patent: Mar. 24, 1987

[54] PROCESS AND DEVICE FOR THE MANUFACTURE OF CONNECTING SEAMS BETWEEN OVERLAPPING SEGMENTS MADE OF ELASTOMERES OR THERMOPLASTIC MATERIALS

[75] Inventors: Hans-Georg Bischoff, Wadern-Noswendel; Franz Koch, Wadern-Buschfeld, both of Fed. Rep. of Germany

[73] Assignee: Saar-Gummiwerk GmbH, Fed. Rep. of Germany

[21] Appl. No.: 758,427

[22] Filed: Jul. 24, 1985

[30] Foreign Application Priority Data

Jul. 24, 1984 [DE] Fed. Rep. of Germany ....... 3427215

[51] Int. Cl.$^4$ .............................................. B32B 31/04
[52] U.S. Cl. ................................ 156/285; 156/308.4; 156/499; 156/581
[58] Field of Search ..................... 156/285, 308.4, 581, 156/499

[56] References Cited

U.S. PATENT DOCUMENTS 3,814,656  6/1974  Hanson et al. .................. 156/581 X
4,032,387  6/1977  Sugiyama et al. .............. 156/285 X
4,135,957  1/1979  Voller ............................. 156/581 X Primary Examiner—Robert A. Dawson
Attorney, Agent, or Firm—James C. Wray

[57] ABSTRACT

In a process for connecting material segments made of an elastomere or of a thermoplastic material the sections to be joined (3,4) are placed between two pressure beams (1,2) in the area of the seam (5) to be created. The pressure beams are not mechanically connected to one another. The forces necessary to hold and to attach the material segments (3,4) are generated by the evacuation of suction chambers formed between the cavities (9) in the contact surfaces (6a,6b) of the pressure beams (1,2) and the segments to be joined (3,4).

10 Claims, 1 Drawing Figure

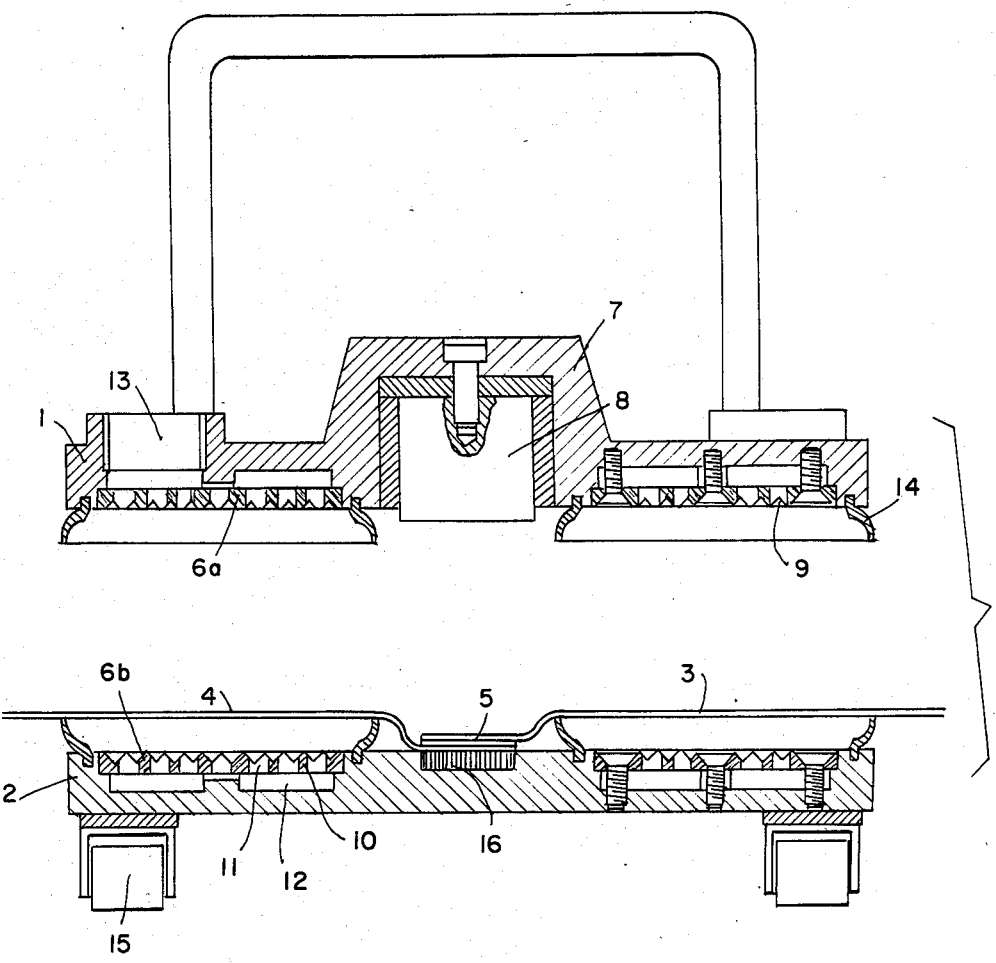

PROCESS AND DEVICE FOR THE MANUFACTURE OF CONNECTING SEAMS BETWEEN OVERLAPPING SEGMENTS MADE OF ELASTOMERES OR THERMOPLASTIC MATERIALS

BACKGROUND OF THE INVENTION

The invention regards a process and a device for the manufacture of connecting seams between overlapping material segments made of elastomers or thermoplastic materials, especially roofing and sealing strips.

In the case of, for example, flat roofs with so called roofing or sealing strips, the creation of joints, especially flat ones, between the individual sealing strips or sheets creates enormous difficulties.

As a rule, sheets composed of individual strips are installed. The prefabrication of sheets with a stationary device permits the easy creation of a permanent watertight union by vulcanizing the individual overlapping segments of the connecting seam. The connecting seams between the individual strips manufactured on site are made by, for example, gluing. The glued seam is generally covered by an adhesive strip.

In the case of a frontal union of sheets made up of individual strips, so called T-joints are created. When the seams of both sheets converge, cross-joints are formed. These areas, due to the stepwise configuration of the connecting seam, create excessively weak spots and have to be additionally reinforced by applying sealing paste or a similar material.

These glued joints have considerable disadvantages compared to those made by vulcanization. The sheets can virtually not be installed without stress. However, since glue requires a certain amount of time for curing, the stress generated by the glue hardening process in the seam area has a negative effect on the quality of the glued joint. Even after the glue has hardened, the resistance of the bonded area remains temperature dependent. In the event of high temperatures (roofs can reach temperatures above 80° C.) the glued joint softens. In time, the effects of fluctuating temperatures can damage the glued joint to such an extent that it starts leaking. In this case extensive and costly repair work is necessary.

So far, the creation of flat vulcanized connecting seams made on site failed due to the fact that it was not possible to securely hold the strips or sheets during vulcanization since the vulcanization device was unable to hold the flat sheets, and consequently, the seam. Due to this, the pressure on the seam necessary for vulcanization can only be applied by the weight of the vulcanization device itself. Consequently, correspondingly heavy devices would be necessary, but these would be extremely difficult to handle on construction sites, especially on roofs.

In order to avoid glued unions it has already been suggested to join the sheets with upright vulcanized seams. The edges of the installed sheets are bent at a right angle, are pressed against one another in the seam area, and are subsequently vulcanized. In this case, the vulcanization device can hold the seam and the necessary pressure can be applied by mechanical or hydraulic displacement of both pressure bearing surfaces against one another.

SUMMARY OF THE INVENTION

However, in every case, strip seams require an additional covering, such as, for example, a layer of gravel. T-joints and the connection of sleeves, such as chimney enclosures and similar structures, can not be created in a practical way.

The task of the present invention consists in describing a process and a device to join overlapping segments of elastomers or thermoplastic materials, which is suited for the simple and economical creation of permanent and tight connecting seams, especially flat connecting seams, on construction sites or on roofs.

The task is solved according to the invention by placing the material segments to be joined between two pressure beams that are not connected to one another by mechanical means. The contact surfaces of the pressure beams have cavities outside of the seam area. The forces necessary to hold and join the segments are generated by the evacuation of suction chambers formed between the cavities on the contact surfaces and the material segments to be joined placed above them.

A device to implement the process is characterized by the cavities configured on both sides of the seam area on the contact surfaces of the pressure beams. The cavities can also be connected to a suction pump.

With the process and device according to the invention tight and permanent connecting seams can be created on construction sites and on roofs in a simple manner, especially flat connecting seams between overlapping segments of materials made of elastomers or thermoplastic substances. The joint is made by, for example, vulcanization.

A pressure beam is placed underneath the segments to be joined so that the overlap area is on the seam area of the pressure beam. Both strips are held by the lower pressure beam by evacuating the suction chambers created by the the cavities located on the sides of the seam area, within the contact surfaces of the pressure beam, and the sheets placed on top. Following this, the second pressure beam, which normally contains the heating element, is placed on top of the lower beam and is pressed against the material by the atmospheric pressure present due to the evacuation of the suction chamber created by the cavities between the contact surfaces and the the sheets. The pressure generated in this way is sufficient to vulcanize the connecting seam.

In an adequate manner, outside of the seam area, the contact surfaces of the pressure beams have been configured as ribs or burls. The evacuation of the suction chambers created by the cavities and the sheets placed above them can be implemented by holes in the contact surfaces and by collector channels configured underneath the contact surfaces, or the evacuation can be implemented by frontal collector channels.

The general cross-section of the rib depressions forming the suction chambers can be configured in such a way by the selection of the pressure beam width, so that, one one hand, sufficiently large pressures are generated by the atmospheric pressure when the suction chambers are evacuated. On the other hand, the peaks of the ribs or the surfaces of the burls will have been configured in such a way as to create a sufficiently large contact surface, so that a flat placement of the segments to be joined is assured within the holding area.

In the following, based on the single FIGURE which is a schematic representation of an implementation example, the invention will be explained in more detail.

The device according to the invention consists of two pressure beams, the upper beam 1 and the lower beam 2, which are not connected to one another by mechanical means. During vulcanization the segments 3, 4 overlapping one another in the area of the seam 5 to be created, are held between the contact surfaces 6a, 6b of the pressure beam 1, 2, are pressed, and finally attached to one another. The heating of the seam 5 is accomplished by a bar shaped electric heating element 8, placed inside a central web of the upper beam 1. The heating element can contain a built-in heat sensing element.

The contact surfaces 6a, 6b of the pressure beams 1,2 have cavities 9 outside of the seam area 5. In the illustrated example, ribbed plates 10 have been inserted into the contact surfaces 6a, 6b, the lengthwise grooves of which form the cavities 9, while the rib peaks form a sufficiently large contact surface for the segments 3,4 to be joined.

The cavities 9 are connected to channels 12 by holes 11. The channels have been arranged underneath the ribbed plates 10. A suction pump can be connected to these channels via connectors 13 located on the frontal area of the pressure beam, or on the top of the beam, such as seen on beam 1.

The suction chambers are formed by the cavities 9 and the segments 3, 4 to be joined. On one hand, the evacuated suction chambers firmly hold the segments 3,4 to be joined to the lower beam 2, and, on the other hand, the upper beam 1 is pressed against the lower beam 2 with the material segments placed on it. The pressure necessary for vulcanization can be assured by establishing a sufficiently large width of the pressure beams 1, 2, and with it, of the total area of the cavities needed for the creation of the suction chambers.

Additional gaskets 14 can be used to seal off the created suction chambers. A certain amount of leakage is by all means allowable since the suction pump can remain in operation during the vulcanization process.

To join both material segments 3,4, first the lower beam 2, which has been provided with casters for easier handling, is placed underneath the open seam 5. The material segments 3,4 placed on upon it are held in place by evacuating the suction chambers. Following this, the upper beam 1 is placed upon the lower beam and then both pressure beams are pressed against one another by evacuating the suction chambers on both beams 1,2 until the vulcanization process has been completed. The length of the pressure beams 1,2 is only limited by the requirements of simple and easy handling. Longer seams 5 can be made in several partial segments without negative effects.

The heating element 8 has been designed to be pressure resistant and it protrudes somewhat from the contact surfaces 6a, 6b of the pressure beams 1, 2. This guarantees that the seam 5 to be created by vulcanization receives a sufficient amount of pressure. The protruding section of the heating element 8 is easily absorbed by the elasticity of the working material segments 3, 4 to be joined, as well as by the gaskets 14 that might be used. In addition, a silicone support 16 or a support made of a different material can be placed on the seam area of the lower beam 2. This support can also have an incorporated heating element. Such a support could be advantageous for the creation of T-joints.

To create closed seams, such as for the connection of sleeves or to repair damages in already installed sheets, the lower beam 2 can be replaced by a simple plate made of i.e. silicone. This plate has been adapted to the shape of the sleeve or of the seam and remains underneath the installed sheet, since in this case, all that is needed is the availability of a smooth lower surface. In this case, under certain circumstances, such as when the seam cannot be composed of individual straight partial segments, a pressure beam which has been adapted in its shape to the shape of the seam must be used. However, the number of necessary specially shaped upper beams can be kept small by a certain standardization of the shape and size of the individual sleeve connections.

We claim:

1. Process for the manufacture of connecting seams between overlapping segments made of elastomers or thermoplastic materials, especially roofing strips and sealing strips, in which the segments to be joined are pressed against one another and heated in the area of the seam to be created, comprising placing the segments to be joined between two juxtaposed pressure beams that are not connected to one another by mechanical means, contact surfaces of the pressure beams having cavities outside of the seam area, applying pressure necessary to join the segments by evacuating suction chambers created by the cavities in the contact surfaces and the segment surfaces to be joined, applying heat to the seam area.

2. The process of claim 1 further comprising, heating along the entire length of the seam area with heating means disposed in at least one pressure beam.

3. The process of claim 2 wherein the seam area is disposed centrally of the contact surface of the pressure beam containing the heating means, and the heating means comprises a heating element being adapted to the width of the seam to be created.

4. An apparatus for the manufacture of connecting seams between overlapping segments made of elastomers or thermoplastic materials, especially roofing strips and sealing strips, comprising,
   first and second mating pressure beams having no mechanical connection to each other, each pressure beam having contact surfaces and cavities formed in the contact surfaces,
   evacuating means, in fluid communication with the cavities, for creating a vacuum in the cavities,
   heating means, disposed within at least one of the pressure beams and overlying the seam area, for heating the seam area, and
   wherein material segments to be joined at the seam area are held between the first and second pressure beams by the vacuum created in the cavities.

5. The apparatus of claim 4 wherein the first and second mating pressure beams comprises upper and lower pressure beams.

6. The apparatus of claim 5 wherein the heating means comprises a heating element disposed within the upper pressure beam.

7. The apparatus of claim 4 further comprising, gaskets disposed peripherally around the contact surfaces of the first and second pressure beams.

8. The apparatus of claim 6 wherein the cavities are connected to channels disposed beneath the contact surfaces by means of holes.

9. The apparatus of claim 6 wherein the heating element protrudes beyond the contact surfaces for applying pressure to the seam area.

10. An apparatus for creating closed seams, such as for the connector of sleeves or the repair damages in previously installed sheets, comprising,
    an upper pressure beam having contact surfaces and cavities formed in the contact surfaces, a lower plate disposed beneath the pressure beam, wherein the plate is adapted to the shape of the sleeve or of the seam and remains underneath the installed sheet, evacuating means, in fluid communication with the cavities, for creating a vacuum in the cavities, heating means, disposed within the pressure beam, and overlying the seam area, for heating the seam area, and wherein material segments are held between the pressure beam and the plate by vacuum created in the cavities.

* * * * *